US012736608B2

(12) United States Patent
Yamaguchi

(10) Patent No.: US 12,736,608 B2
(45) Date of Patent: Sep. 15, 2026

(54) POSITION DETERMINATION SYSTEM

(71) Applicant: MINEBEA MITSUMI Inc., Nagano (JP)

(72) Inventor: Kohei Yamaguchi, Hiroshima (JP)

(73) Assignee: MINEBEA MITSUMI INC., Nagano (JP)

( * ) Notice: Subject to any disclaimer, the term of this patent is extended or adjusted under 35 U.S.C. 154(b) by 270 days.

(21) Appl. No.: 18/716,264

(22) PCT Filed: Dec. 6, 2022

(86) PCT No.: PCT/JP2022/044926
§ 371 (c)(1),
(2) Date: Jun. 4, 2024

(87) PCT Pub. No.: WO2023/112775
PCT Pub. Date: Jun. 22, 2023

(65) Prior Publication Data

US 2025/0044399 A1 Feb. 6, 2025

(30) Foreign Application Priority Data

Dec. 14, 2021 (JP) ................................ 2021-202621

(51) Int. Cl.
*G01S 5/14* (2006.01)

(52) U.S. Cl.
CPC .................................... *G01S 5/14* (2013.01)

(58) Field of Classification Search
CPC ................................. G01S 5/14; B60R 25/24
(Continued)

(56) References Cited

U.S. PATENT DOCUMENTS 10,257,730 B1 4/2019 Van Wiemeersch et al.
10,688,965 B2 * 6/2020 Breer ....................... G01S 5/14
(Continued)

FOREIGN PATENT DOCUMENTS

JP H10-282204 A 10/1998
JP 2017-110373 A 6/2017
(Continued)

OTHER PUBLICATIONS

International Search Report for corresponding International Application No. PCT/JP2022/044926 mailed Jan. 31, 2023.
(Continued)

*Primary Examiner* — Chieh M Fan
(74) *Attorney, Agent, or Firm* — Chrisman Gallo Tochtrop LLC

(57) ABSTRACT

A position determination system includes: at least four communication devices respectively acquiring distances to a mobile terminal; a position determination unit determining a position of the mobile terminal from the distances acquired respectively by the at least four communication devices; a region determination unit determining, from the position of the mobile terminal determined by the position determination unit, which region of a plurality of regions set around the vehicle or in a vehicle interior the mobile terminal is positioned; and a selection unit selecting three distances from the distances acquired respectively by the at least four communication devices depending on the region where the mobile terminal is positioned determined by the region determination unit. The position determination unit determines the position of the mobile terminal 3 from the three distances selected by the selection unit.

7 Claims, 6 Drawing Sheets

(58) Field of Classification Search
USPC ........................................................ 455/456.1
See application file for complete search history.

(56) References Cited

U.S. PATENT DOCUMENTS

| | | | | |
|---|---|---|---|---|
| 12,072,431 | B2 * | 8/2024 | Mizuno | G01S 5/0221 |
| 2015/0208207 | A1 * | 7/2015 | Ye | H04W 4/023<br>455/456.1 |
| 2019/0111891 | A1 | 4/2019 | Weghaus et al. | |
| 2020/0045498 | A1 * | 2/2020 | Knobloch | H04W 4/40 |
| 2021/0356555 | A1 | 11/2021 | Sanji et al. | |
| 2021/0387642 | A1 * | 12/2021 | Böhler | B60L 53/12 |
| 2023/0324498 | A1 * | 10/2023 | Naiki | G01S 11/06<br>455/456.1 |
| 2025/0020793 | A1 * | 1/2025 | Yatabe | G01S 13/878 |
| 2025/0106806 | A1 * | 3/2025 | Iwahori | H04W 64/00 |

FOREIGN PATENT DOCUMENTS

| | | | | |
|---|---|---|---|---|
| JP | 2019-523866 | A | 8/2019 | |
| JP | 2020-112521 | A | 7/2020 | |
| JP | 2020-122725 | A | 8/2020 | |
| WO | 2017/104373 | A1 | 6/2017 | |
| WO | WO-2023112777 | A1 * | 6/2023 | G01S 5/14 |
| WO | WO-2025253980 | A1 * | 12/2025 | G01S 13/76 |

OTHER PUBLICATIONS

Written Opinion for corresponding International Application No. PCT/JP2022/044926 dated Jan. 31, 2023.

* cited by examiner

1
Position determination system
10A
First communication device
10B
First communication device
10C
First communication device
20A
Second communication device
20B
Second communication device
20C
Second communication device
20D
Second communication device
30
Control device
31
Position determination unit
32
Region determination unit
33
Selection unit
3

| Priority | Region | | | | | |
|---|---|---|---|---|---|---|
| | A1 | A2 | A3 | A4 | A5 | A6 |
| 1 | L1A (10A)<br>L2A (20A)<br>L2B (20B) | L1B (10B)<br>L2A (20A)<br>L2C (20C) | L1B (10B)<br>L2C (20C)<br>L2D (20D) | L1A (10A)<br>L2C (20C)<br>L2D (20D) | L1A (10A)<br>L2B (20B)<br>L2D (20D) | L1A (10A)<br>L1B (10B)<br>L1C (10C) |
| 2 | L1B (10B) | L1A (10A) | L1C (10C) | L1C (10C) | L1B (10B) | — |
| 3 | L1C (10C) | L1C (10C) | L1A (10A) | L1B (10B) | L1C (10C) | — |
| 4 | L2C (20C) | L2B (20B) | L2A (20A) | L2A (20A) | L2A (20A) | — |
| 5 | L2D (20D) | L2D (20D) | L2B (20B) | L2B (20B) | L2C (20C) | — |

Start
S1
Acquire distances
S2
Determine provisional position
S3
Determine provisional region
S4
Select distances
S5
Determine position
S6
Determine region
S7
Has engine been started?
YES
NO
S8
Acquire distances
End

POSITION DETERMINATION SYSTEM

CROSS-REFERENCE TO RELATED APPLICATIONS

This is a national phase application in the United States of International Patent Application No. PCT/JP2022/044926 with an international filing date of Dec. 6, 2022, which claims priority of Japanese Patent Application No. 2021-202621 filed on Dec. 14, 2021, the contents of which are incorporated herein by reference.

TECHNICAL FIELD

The present disclosure relates to a position determination system.

BACKGROUND ART

There is a conventional position determination system that performs wireless communication between a plurality of communication devices provided in a vehicle and a mobile terminal carried by a user, and determines a position of the mobile terminal with respect to the vehicle by triangulation using a propagation time or a signal strength of a radio wave. For example, JP 2019-523866 A describes a position determination system that determines the position of a mobile terminal by using three communication devices disposed at positions different from one another of a vehicle.

SUMMARY OF THE INVENTION

Problems to be Solved by the Invention

In the position determination system described above, accuracy of position determination may decrease depending on the position of the mobile terminal with respect to the vehicle.

An object of the present disclosure is to improve accuracy of position determination in a position determination system that determines a position of a mobile terminal.

Solutions to the Problems

One aspect of the present disclosure provides a position determination system including: at least four communication devices provided in a vehicle and acquiring respective distances to a mobile terminal around the vehicle or in a vehicle interior by wireless communication with the mobile terminal; a position determination unit determining a position of the mobile terminal from the distances respectively acquired by the at least four communication devices; a region determination unit determining, from the position of the mobile terminal determined by the position determination unit, which region of a plurality of regions set around the vehicle and in the vehicle interior the mobile terminal is positioned; and a selection unit selecting three distances from the distances acquired by the at least four communication devices depending on the region in which the region determination unit determines the mobile terminal is positioned, in which the position determination unit determines the position of the mobile terminal from the three distances selected by the selection unit.

According to this configuration, it is possible to improve accuracy of position determination by selecting appropriate three distances from at least four distances acquired by at least four communication devices and performing position determination of a mobile terminal depending on which of the regions set for a vehicle the position of the mobile terminal is in.

Effects of the Invention

According to the present disclosure, accuracy of position determination of a mobile terminal can be improved.

BRIEF DESCRIPTION OF THE DRAWINGS

FIG. 5 is a view showing a selection table according to the embodiment.

DETAILED DESCRIPTION

An embodiment of the present disclosure will be described below with reference to the accompanying drawings.

Figure 1:
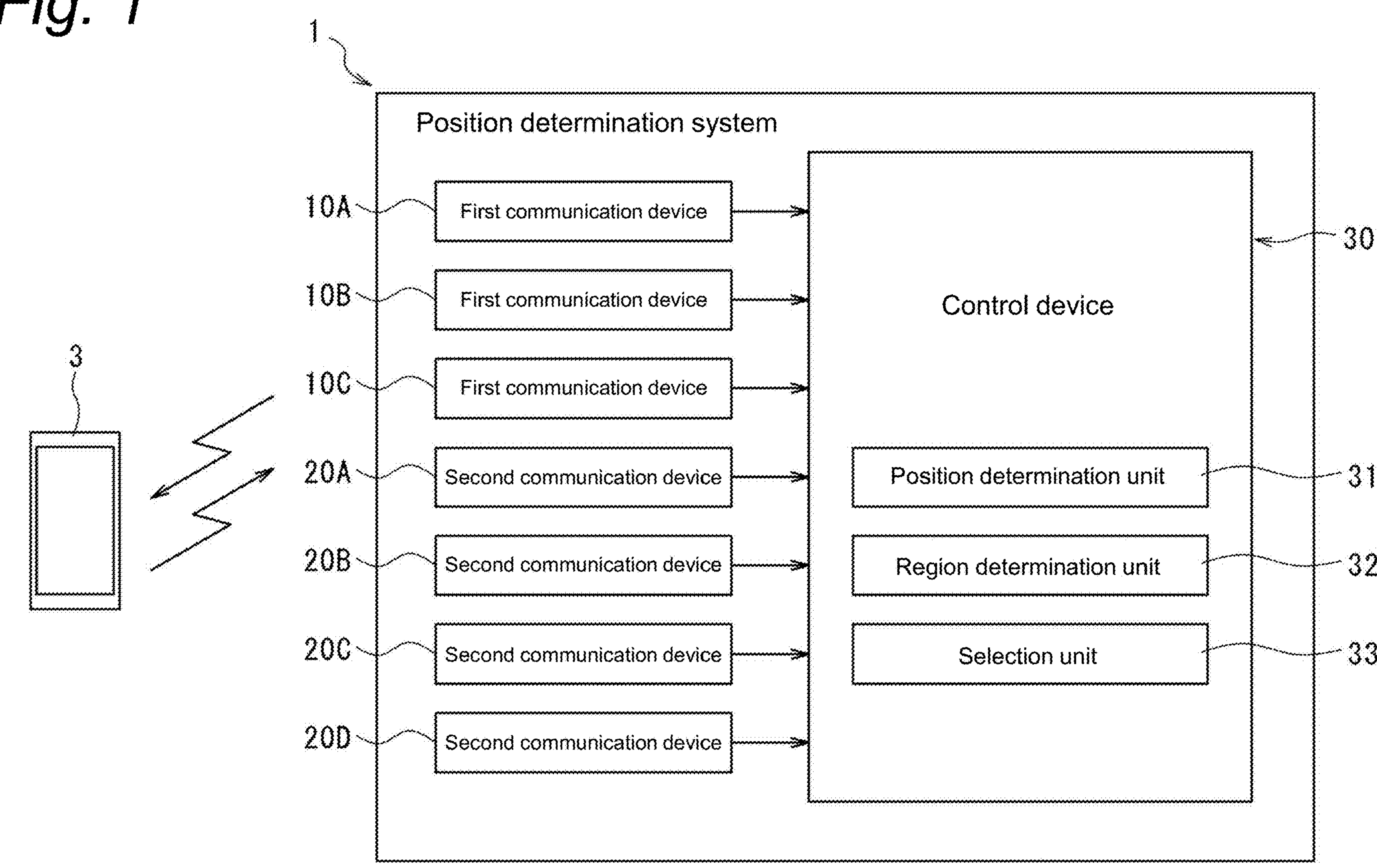
FIG. 1 is a block diagram of a position determination system according to an embodiment of the present disclosure.

With reference to FIG. 1, a position determination system 1 determines a position of a smartphone 3 around a vehicle 2 (shown in FIG. 2) (i.e., outside the vehicle interior) or in the vehicle interior. The position determination system 1 is mounted on the vehicle 2. The position determination system 1 includes three first communication devices 10A to 10C, four second communication devices 20A to 20D, and a control device 30. The first communication devices 10A to 10C of the present embodiment are examples of communication devices according to the present disclosure. The second communication devices 20A to 20D according to the present embodiment are examples of communication devices according to the present disclosure. The smartphone 3 of the present embodiment is an example of a mobile terminal according to the present disclosure. The mobile terminal according to the present disclosure is not limited to the smartphone 3 of the present embodiment, and may be, for example, a tablet terminal or a wearable terminal.

In the following description, a front-rear direction of the vehicle 2, that is, a vehicle length direction may be called an X direction, a left-right direction of the vehicle 2, that is, a vehicle width direction may be called a Y direction, and an up-down direction of the vehicle 2, that is, a vehicle height direction may be called a Z direction.

In the following description, when it is not necessary to particularly distinguish each of the three first communication devices 10A to 10C, one of them may be simply called a “first communication device 10”. In the following description, when it is not necessary to particularly distinguish each of the four second communication devices 20A to 20D, one of them may be simply called a “second communication device 20”. In the following description, when it is not necessary to particularly distinguish the first communication device 10 and the second communication device 20, one of them may be simply called a “communication device”.

The communication device is a wireless communication device that wirelessly communicates with the smartphone 3.

The communication device performs ultra wide band (UWB) communication with the smartphone 3.

The communication device acquires a distance to the smartphone 3 by performing wireless communication with the smartphone 3. Upon receiving a request signal from the smartphone 3, the communication device transmits a response signal to the smartphone 3. Upon receiving a response signal from the communication device, the smartphone 3 calculates a time Δt1 from transmission of the request signal to reception of the response signal. The smartphone 3 transmits information about the time Δt1 to the communication device. The communication device calculates a time Δt2 from reception of the request signal to transmission of the response signal. The communication device calculates a propagation time of the signal between the communication device and the smartphone 3 from the time Δt1 and the time Δt2. The communication device calculates and acquires the distance from the communication device to the smartphone 3 by multiplying the propagation time by the speed of the signal.

Figure 2:
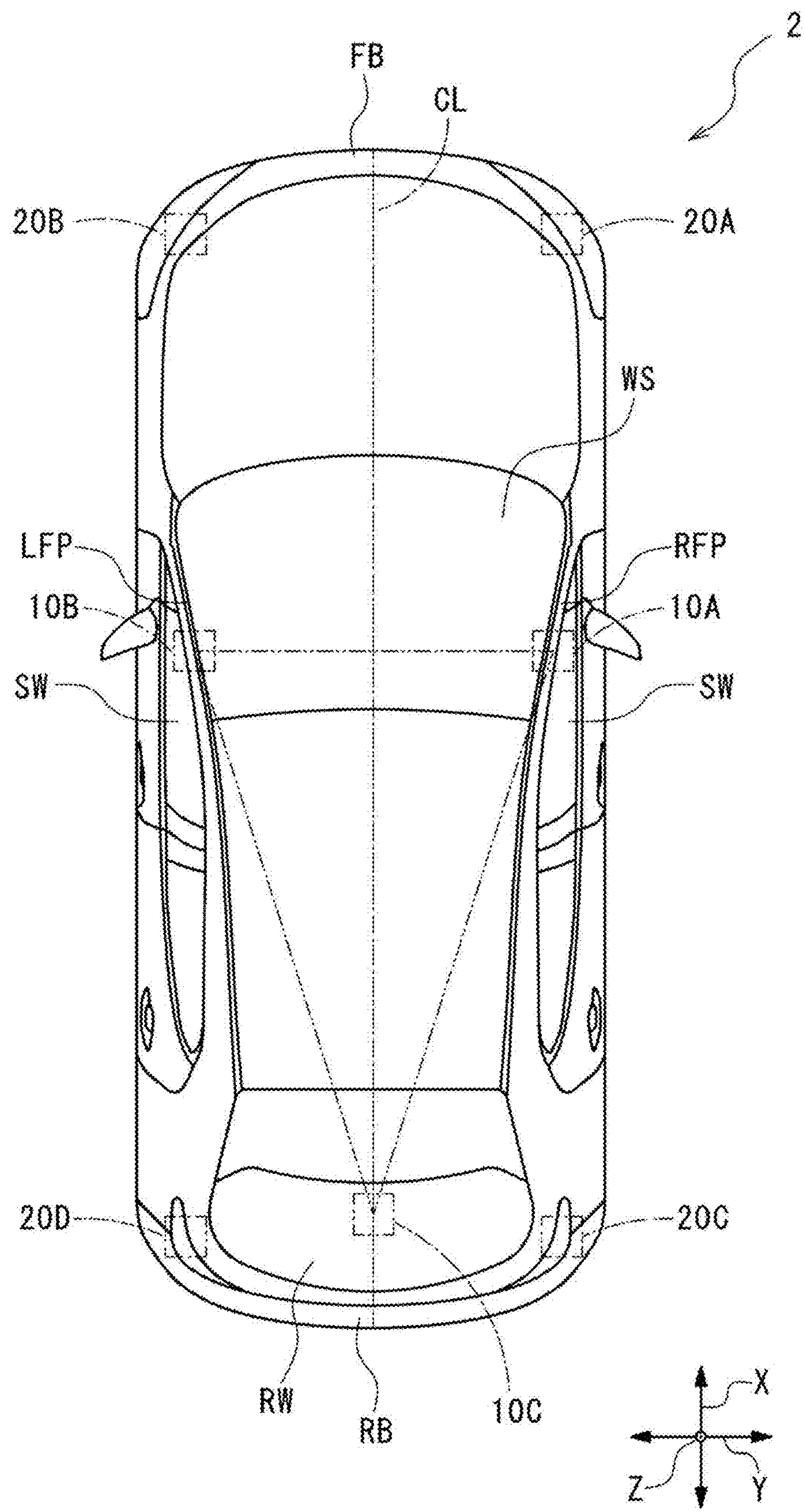
FIG. 2 is a top view of a vehicle according to the embodiment.
Figure 3:
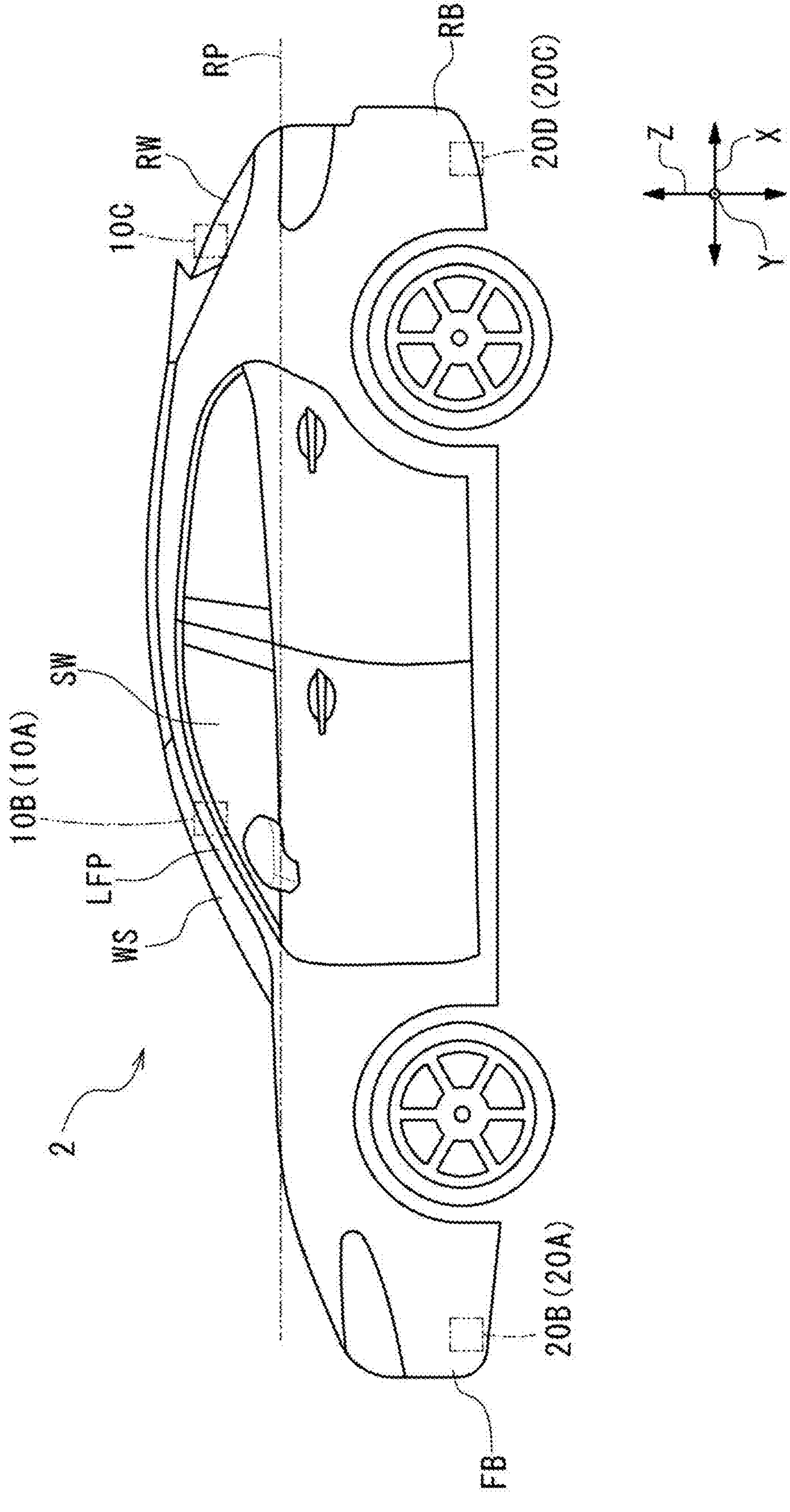
FIG. 3 is a side view of the vehicle according to the embodiment.

As shown in FIGS. 2 and 3, the first communication device 10 is disposed in the vehicle interior of the vehicle 2. In the present embodiment, the first communication devices 10A and 10B are attached to a pair of front pillars RFP and LFP of the vehicle 2, respectively. The pair of front pillars RFP and LFP are disposed between a windshield WS that is a non-metallic member such as glass disposed in a front part of the vehicle interior and a side window SW that is a non-metallic member such as glass disposed in the side part of the vehicle interior. In the present embodiment, the first communication device 10C is attached to a rear window RW that is a non-metallic member such as glass disposed in a rear part of the vehicle interior. The first communication device 10C may be attached to a peripheral member (not illustrated) made of a resin disposed around the rear window RW. In other words, the first communication device 10C may be attached to the peripheral member disposed to surround the rear window RW.

As shown in FIG. 2, the first communication devices 10A to 10C are disposed at positions different from one another when the vehicle 2 is viewed along the Z direction. In other words, one first communication devices 10 of the first communication devices 10A to 10C is disposed at a position different from the other first communication devices 10 in either the X direction or the Y direction. In other words, the first communication devices 10A to 10C are disposed at positions not overlapping one another when the vehicle 2 is viewed along the Z direction. In other words, the first communication devices 10A to 10C are disposed at intervals from one another when the vehicle 2 is viewed along the Z direction. The first communication devices 10A to 10C are disposed such that a triangle (indicated by a two-dot chain line in FIG. 2) is formed by three straight lines connecting the first communication devices 10A to 10C when the vehicle 2 is viewed along the Z direction. In other words, the first communication devices 10A to 10C are not disposed on an identical straight line.

The first communication device 10A and the first communication device 10B are disposed at the same position in the X direction. The first communication devices 10A and 10B and the first communication device 10C are disposed at different positions in the X direction. In other words, the first communication devices 10A and 10B and the first communication device 10C are disposed at positions different from one another when the vehicle 2 is viewed along the Y direction.

The first communication devices 10A to 10C are disposed at positions different from one another in the Y direction. In other words, the first communication devices 10A to 10C are disposed at positions different from one another when the vehicle 2 is viewed along the X direction. The first communication device 10A and the first communication device 10B are disposed line-symmetrically with respect to a vehicle body center line CL extending in the X direction. The first communication device 10C is disposed on the vehicle body center line CL. The arrangement of the first communication devices 10A to 10C may be changed depending on the structure in the vehicle interior. For example, the first communication device 10A and the first communication device 10B may be disposed asymmetrically with respect to the vehicle body center line CL, and the first communication device 10C may be disposed off from the vehicle body center line CL.

As shown in FIG. 3, the first communication devices 10A to 10C are disposed at the same height. The first communication devices 10A to 10C are disposed at positions higher than a reference plane RP that passes through a lower end of the side window SW and is parallel to a horizontal plane. Specifically, the reference plane RP is a plane that passes through a lower end of a portion of the side window SW exposed to the outside and is parallel to the horizontal plane when the vehicle 2 is viewed along the Y direction. In other words, the reference plane RP is a plane that passes through the lower ends of the front pillars RFP and LFP and is parallel to the horizontal plane. The first communication devices 10A and 10B and the first communication device 10C may be disposed at different heights. The first communication devices 10A to 10C may be disposed at different heights.

As shown in FIG. 2, the second communication device 20 is disposed outside the vehicle interior of the vehicle 2. In the present embodiment, the second communication devices 20A and 20B are attached to a front bumper FB made of resin. In the present embodiment, the second communication devices 20C and 20D are attached to a rear bumper RB made of resin.

As shown in FIG. 2, the second communication devices 20A to 20D are disposed at positions different from one another when the vehicle 2 is viewed along the Z direction. In other words, one second communication devices 20 of the second communication devices 20A to 20D is disposed at a position different from the other second communication devices 20 in either the X direction or the Y direction. In other words, the second communication devices 20A to 20D are disposed at positions not overlapping one another when the vehicle 2 is viewed along the Z direction. In other words, the second communication devices 20A to 20D are disposed at intervals from one another when the vehicle 2 is viewed along the Z direction.

The second communication device 20A and the second communication device 20B are disposed at the same position in the X direction. The second communication device 20C and the second communication device 20D are disposed at the same position in the X direction. The second communication devices 20A and 20B and the second communication devices 20C and 20D are disposed at positions different from one another in the X direction. In other words, the second communication devices 20A and 20B and the second communication devices 20C and 20D are disposed at positions different from one another when the vehicle 2 is viewed along the Y direction.

The second communication device 20A and the second communication device 20C are disposed at the same position in the Y direction. The second communication device 20B and the second communication device 20D are disposed at the same position in the Y direction. The second communication devices 20A and 20C and the second communication devices 20B and 20D are disposed at positions different from one another in the Y direction. In other words, the second communication devices 20A and 20C and the second communication devices 20B and 20D are disposed at positions different from one another when the vehicle 2 is viewed along the X direction. The second communication device 20A and the second communication device 20B are disposed line-symmetrically with respect to the vehicle body center line CL. The second communication device 20C and the second communication device 20D are disposed line-symmetrically with respect to the vehicle body center line CL. The second communication devices 20A to 20D may be disposed at positions different from one another in the Y direction. In other words, the second communication devices 20A to 20D may be disposed at positions different from one another when the vehicle 2 is viewed along the X direction.

As shown in FIG. 3, the second communication devices 20A to 20D are disposed at the same height. The second communication devices 20A to 20D may be disposed at positions different from one another. The second communication device 20 is disposed at a position lower than the reference plane RP.

As shown in FIG. 2, the first communication device 10 and the second communication device 20 are disposed at positions different from one another when the vehicle 2 is viewed along the Z direction. In other words, the first communication device 10 and the second communication device 20 are disposed at positions not overlapping when the vehicle 2 is viewed along the Z direction. In other words, the first communication device 10 and the second communication device 20 are disposed at intervals from one another when the vehicle 2 is viewed along the Z direction. The first communication device 10C and the second communication devices 20C and 20D are disposed at substantially the same position in the X direction. The first communication device 10A and the second communication devices 20A and 20C are disposed at substantially the same position in the Y direction. The first communication device 10B and the second communication devices 20B and 20D are disposed at substantially the same position in the Y direction.

As shown in FIG. 3, the first communication device 10 and the second communication device 20 are disposed at different heights. Specifically, the second communication device 20 is disposed at a position lower than the first communication device 10 in the Z direction.

As shown in FIG. 1, the control device 30 is electrically connected to the first communication devices 10A to 10C and the second communication devices 20A to 20D. Distances L1A to L1C between the first communication devices 10A to 10C and the smartphone 3 are input to the control device 30 from the first communication devices 10A to 10C, respectively. Distances L2A to L2D between the second communication devices 20A to 20D and the smartphone 3 are input to the control device 30 from the second communication devices 20A to 20D, respectively.

The control device 30 is an electronic control unit (ECU). The control device 30 includes hardware such as a computer and an input/output circuit, and software implemented in the computer. The control device 30 includes a position determination unit 31, a region determination unit 32, and a selection unit 33.

The position determination unit 31 determines the position of the smartphone 3. The distances L1A to L1C from the first communication devices 10A to 10C to the smartphone 3 and the distances L2A to L2D from the second communication devices 20A to 20D to the smartphone 3 are input to the position determination unit 31. The position determination unit 31 determines and outputs the position of the smartphone 3 by trilateration using three distances among the distances L1A to L1C and L2A to L2D.

In a case where the three distances described later are not selected by the selection unit 33, the position determination unit 31 determines a provisional position of the smartphone 3 by using discretionary three distances (three distances that are the first to third shortest of the distances L1A to L1C and L2A to L2D in the present embodiment) among the distances L1A to L1C and L2A to L2D. In the determination of the provisional position of the smartphone 3, a planar position of the smartphone 3 is determined. On the other hand, after the selection unit 33 selects three distances, the position determination unit 31 determines the position of the smartphone 3 using the three distances. In the position determination of this smartphone 3, a spatial position of the smartphone 3 is determined.

In order to determine the spatial position of the smartphone 3, that is, the position in the X, Y, and Z directions, it is theoretically necessary to perform position calculation using four distances acquired respectively by four communication devices that are not on an identical plane. In a case where trilateration is performed using three distances acquired respectively by three communication devices, two possible positions are determined as the position of the smartphone 3, but by determining to adopt one of them in advance, the spatial position of the smartphone 3 can be determined by the three communication devices.

Figure 4:
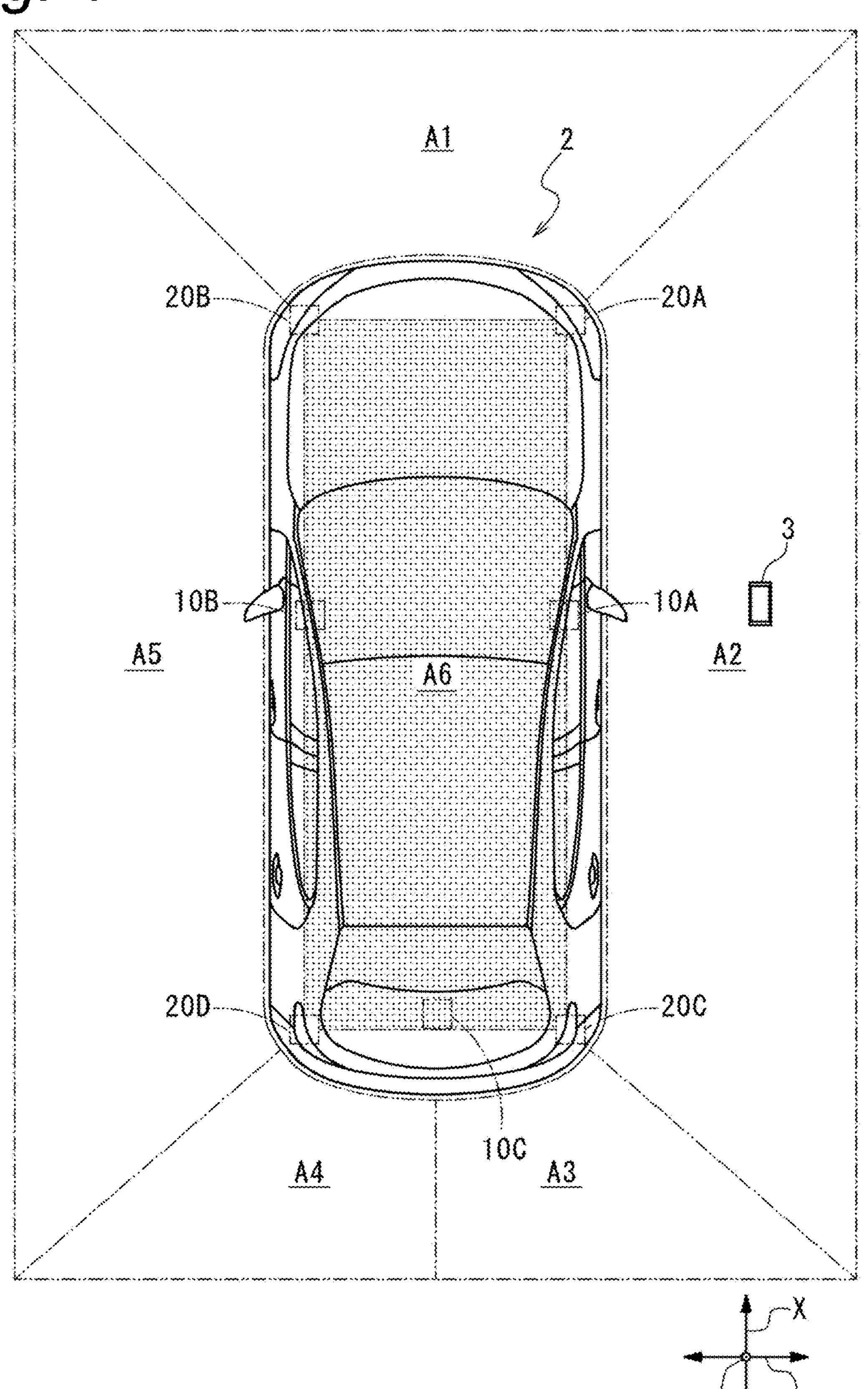
FIG. 4 is a view showing regions according to the embodiment.

The position of the smartphone 3 determined by the position determination unit 31 is input to the region determination unit 32. The region determination unit 32 determines, from the position of the smartphone 3, and outputs a region to which the smartphone 3 belongs. Specifically, as shown in FIG. 4, the region determination unit 32 sets regions A1 to A6 around the vehicle 2 and in the vehicle interior, and determines, from the position of the smartphone 3, which region of the regions A1 to A6 the smartphone 3 belongs to. In FIG. 4, only the region A6 is hatched for clarity.

When the three distances described later are not selected by the selection unit 33, the region determination unit 32 determines, from the provisional position of the smartphone 3 determined by the position determination unit 31, a provisional region to which the smartphone 3 belongs. On the other hand, after the three distances are selected by the selection unit 33, the region determination unit 32 determines the region to which the smartphone 3 belongs from the position of the smartphone 3 determined by the position determination unit 31 using the three distances.

The regions A1 to A5 are set around the vehicle 2, and the region A6 is set in the vehicle interior of the vehicle 2. The region A1 is a region positioned in front of the vehicle 2. The region A2 is a region positioned on the right side of the vehicle 2. The region A3 is a region positioned on the right rear of the vehicle 2. The region A4 is a region positioned on the left rear of the vehicle 2. The region A5 is a region positioned on the left side of the vehicle 2. The region A6 is a region positioned in the vehicle interior of the vehicle 2. The setting of the region is not limited to this. The region may be set in accordance with the number and arrangement of the communication devices.

The region to which the smartphone 3 belongs and which is determined by the region determination unit 32 is input to the selection unit 33. The selection unit 33 selects and outputs three distances used in position determination by the position determination unit 31 depending on the region to which the smartphone 3 belongs. Specifically, the selection unit 33 selects three distances to be used in the position determination in accordance with a selection table T shown in FIG. 5. The selection table T is stored in a storage unit not illustrated of the control device 30.

The selection table T indicates as to what priority the selection unit 33 selects the three distances to be used in the position determination in a case where the region to which the smartphone 3 belongs is given. In FIG. 5, a reference indicating the communication device that acquires the distance is described in parentheses written next to the distance (e.g., the reference 10A indicating the first communication device 10A for the distance L1A).

The selection unit 33 selects three distances in accordance with the priorities set for the respective regions A1 to A6. The selection unit 33 basically selects the three distances set to a priority 1. The distances set to priorities 2 to 5 are spares for a case where any of the three distances set to the priority 1 is unusable. In a case where any of the selected three distances is unusable due to a communication trouble or failure of the communication device, the selection unit 33 selects a distance with the highest priority of the unselected distances in place of the unusable distance.

With reference to the selection table T, three distances are set as the priority 1 for each of the regions A1 to A6. For each of the regions A1 to A5, the priorities 2 to 5 are set in addition to the priority 1. On the other hand, only the priority 1 is set for the region A6.

The three distances of the priority 1 include at least one of the distances acquired by the first communication device 10. The three distances of the priority 1 are selected such that straight lines connecting the three communication devices that acquire the three distances of the priority 1 form a triangle when the vehicle 2 is viewed along the Z direction. In other words, when the vehicle 2 is viewed along the Z direction, the three communication devices that acquire the three distances of the priority 1 are not disposed on an identical straight line. In other words, when the vehicle 2 is viewed along the Z direction, the three communication devices that acquire the three distances of the priority 1 include at least two communication devices disposed at positions different from each other in the X direction, and include at least two communication devices disposed at positions different from each other in the Y direction.

In the priorities 2 to 5 of each of the regions A1 to A5, the priority of the distance acquired by the first communication device 10 provided in the vehicle interior is higher than the priority of the distance acquired by the second communication device 20. By setting the priorities 2 to 5 of each of the regions A1 to A5 in this manner, the first communication device 10 disposed in the vehicle interior of the vehicle 2 and having a lower risk of failure than that of the second communication device 20 disposed outside the vehicle interior of the vehicle 2 is preferentially selected, and therefore the stability of the operation of the position determination system 1 can be improved.

Figure 6:
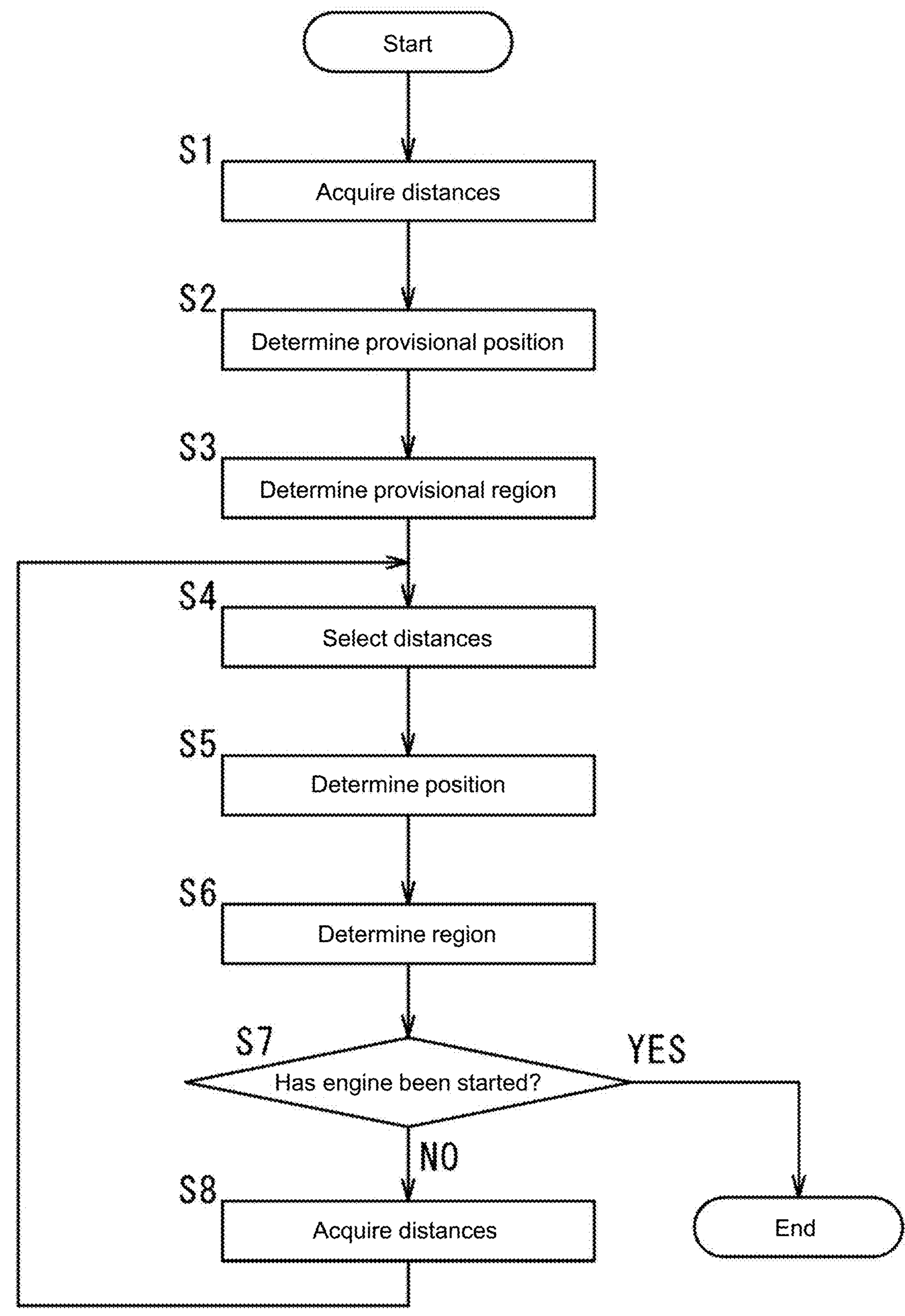
FIG. 6 is a flowchart of position determination processing according to the embodiment.

FIG. 6 is a flowchart of the position determination processing executed by the position determination system 1.

With reference to FIG. 6, the position determination system 1 starts the position determination processing when the control device 30 detects approach of the user. The control device 30 performs Bluetooth low energy (BLE) (Bluetooth is a registered trademark) communication with the smartphone 3, and detects approach of the user when a received signal strength indicator (RSSI) is equal to or greater than a predetermined threshold. Upon detecting approach of the user, the control device 30 transmits a trigger signal to the smartphone 3. Upon receiving the trigger signal, the smartphone 3 periodically transmits a request signal to the communication device. The control device 30 may detect approach of the user to the vehicle 2 using an ultrasonic sensor, a millimeter wave radar, or the like.

In step S1, the first communication device 10 performs UWB communication with the smartphone 3 to acquire the distances L1A to L1C between the first communication device 10 and the smartphone 3. In step S1, the second communication device 20 performs UWB communication with the smartphone 3 to acquire the distances L2A to L2D between the second communication device 20 and the smartphone 3.

In step S2, the position determination unit 31 determines a provisional position of the smartphone 3 by using the three distances that are the first to third shortest of the distances L1A to L1C and L2A to L2D. In step S2, not a spatial position but a planar position of the smartphone 3 is determined. In other words, in step S2, the position of the smartphone 3 is determined in the X direction and the Y direction. In step S2, the three distances used for the position determination of the smartphone 3 are not limited to the three distances that are the first to third shortest of the distances L1A to L1C and L2A to L2D. The position determination unit 31 may use any three of the distances L1A to L1C and L2A to L2D.

In step S3, the region determination unit 32 determines a provisional region to which the smartphone 3 belongs from the position of the smartphone 3 determined by the position determination unit 31. Specifically, the region determination unit 32 determines, from the position of the smartphone 3 in the X direction and the Y direction, which of the regions A1 to A6 set in advance the smartphone 3 belongs to.

In step S4, the selection unit 33 selects three distances depending on the region to which the smartphone 3 belongs. Specifically, in accordance with the selection table T shown in FIG. 5, the selection unit 33 selects three distances to be used for the position determination in step S5 described later depending on the region to which the smartphone 3 belongs.

In step S5, the position determination unit 31 determines and updates the position of the smartphone 3 by using the three distances selected in step S4. That is, unlike the position determination in step S2, the position determination in step S5 is executed using the three distances selected by the selection unit 33. Unlike the position determination in step S2, the position determination in step S5 determines the position of the smartphone 3 in the X direction, the Y direction, and the Z direction. The control device 30 locks and unlocks a door of the vehicle 2 with reference to the position of the smartphone 3 determined in step S5.

In step S6, the region determination unit 32 determines and updates the region to which the smartphone 3 belongs, from the position of the smartphone 3 determined by the position determination unit 31 in step S5.

In step S7, the control device 30 determines whether or not an engine (not illustrated) of the vehicle 2 has been started. If the control device 30 determines that the engine of the vehicle 2 is started, the position determination system 1 ends the position determination processing. If the control device 30 determines that the engine of the vehicle 2 is not started, the processing proceeds to step S8.

In step S8, the first communication device 10 performs UWB communication with the smartphone 3, and acquires and updates information on the distances L1A to L1C between the first communication device 10 and the smartphone 3. In step S8, the second communication device 20 performs UWB communication with the smartphone 3, and acquires and updates information on the distances L2A to L2D between the second communication device 20 and the smartphone 3. Thereafter, the position determination processing proceeds to step S4.

The position determination system 1 of the present embodiment has the following functions.

The position determination system 1 can improve accuracy of position determination by selecting three distances to be used for the position determination depending on the region to which the smartphone 3 belongs. For example, in a case where the smartphone 3 is at the position shown in FIG. 4, if the position of the smartphone 3 is determined using the distances L1A, L2A, and L2C that are the first to third shortest of the distances L1A to L1C and L2A to L2D, the accuracy of the position determination may decrease. Specifically, since the first communication device 10A and the second communication devices 20A and 20C that acquire the distances L1A, L2A, and L2C are disposed at substantially the same position in the Y direction, the accuracy of the position determination may decrease. On the other hand, in a case where the smartphone 3 is at the position shown in FIG. 4, the position determination system of the present embodiment determines the position of the smartphone 3 by using the distances L1B, L2A, and L2C. Since the first communication device 10B that acquires the distance L1B and the second communication devices 20A and 20C that acquire the distances L2A and L2C are disposed at different positions in the Y direction, the accuracy of the position determination can be improved as compared with the case of determining the position of the smartphone 3 by using the first to third shortest distances of the distances L1A to L1C and L2A to L2D.

When three communication devices that acquire three distances used for position determination are disposed at the same height, the accuracy of position determination may decrease. On the other hand, in the present embodiment, the first communication device 10 and the second communication device 20 are disposed at positions different from each other in the Z direction of the vehicle 2, and the selection unit 33 selects three distances to be used in the position determination so as to include at least one of the distances acquired by the first communication device 10. This can improve the accuracy of position determination as compared with a case where three communication devices that acquire three distances used in the position determination are disposed at the same height.

When the first communication device 10 is surrounded by a metal part such as the body of the vehicle 2 in the horizontal direction, UWB radio waves are shielded by the body in a case where the first communication device 10 communicates with the smartphone 3 outside the vehicle interior, and therefore, the accuracy of the position determination may decrease. On the other hand, in the present embodiment, the first communication devices 10A and 10B are provided on the pair of left and right front pillars RFP and LFP of the vehicle 2, respectively, and the first communication device 10C is provided on the rear window RW of the vehicle 2 or a peripheral member (not illustrated) disposed around the rear window RW. Due to this, when the first communication devices 10A and 10B communicate with the smartphone 3 outside the vehicle interior, UWB radio waves can pass through a non-metallic member such as the windshield WS or the side window SW, and therefore it is possible to reduce the influence of the metal part of the vehicle body in the accuracy of position determination. Similarly, when the first communication device 10C communicates with the smartphone 3 outside the vehicle interior, UWB radio waves can pass through a non-metallic member such as the rear window RW, and therefore, a metal part such as the body of the vehicle 2 can hardly have an influence. This can improve the accuracy of position determination as compared with a case where the first communication device 10 is surrounded by a metal part such as the body of the vehicle 2 in the horizontal direction.

In a case where the position of the smartphone 3 positioned in the vehicle interior is determined using the three distances L1A to L1C acquired by the first communication devices 10A to 10C, if the first communication devices 10A to 10C are disposed at the same position in the X direction or the Y direction, the accuracy of the position determination may decrease. On the other hand, in the present embodiment, the first communication devices 10A and 10B and the first communication device 10C are disposed at positions different from one another in the X direction, and the first communication devices 10A to 10C are disposed at positions different from one another in the Y direction. Therefore, the accuracy of position determination can be improved as compared with a case where the first communication devices 10A to 10C are disposed at the same position in the X direction or the Y direction.

In a case where the position of the smartphone 3 positioned in the vehicle interior is determined using the three distances L1A to L1C acquired by the first communication devices 10A to 10C, if the first communication devices 10A to 10C are disposed an identical straight line, the accuracy of the position determination may decrease. The first communication devices 10A to 10C are disposed such that straight lines connecting the first communication devices 10A to 10C form a triangle when the vehicle 2 is viewed along the Z direction. This can improve the accuracy of position determination as compared with a case where the three first communication devices 10 are disposed on an identical straight line.

Although a specific embodiment of the present invention has been described above, the present invention is not limited to the above embodiment, and various modifications can be made within the scope of this invention.

The position determination system 1 may include at least four communication devices. The number and arrangement of the first communication devices 10 included in the at least four communication devices are not limited. The number and arrangement of the second communication devices 20 included in the at least four communication devices are not limited.

The number of the first communication devices 10 is not limited to three. The number of the first communication devices 10 may be four or more. In this case, it is preferable that the four or more first communication devices 10 include three first communication devices 10 disposed at positions different from one another when the vehicle 2 is viewed along the Z direction. It is preferable that at least two of the first communication devices 10 of the three first communication devices 10 be disposed at positions different from each other in the X direction. It is preferable that at least two of the first communication devices 10 of the three first communication devices 10 be disposed at positions different from each other in the Y direction. It is preferable that the four or more first communication devices 10 include the three first communication devices 10 in which straight lines connecting the respective first communication devices form a triangle when the vehicle 2 is viewed along the Z direction.

The number of the second communication devices 20 is not limited to four.

The invention claimed is:

1. A position determination system comprising:

at least four communication devices provided in a vehicle and acquire respective distances to a mobile terminal by wireless communication with the mobile terminal around the vehicle or in a vehicle interior;

a position determination unit determining a provisional position of the mobile terminal from the distances respectively acquired by the at least four communication devices;

a region determination unit determining, from the provisional position of the mobile terminal determined by the position determination unit, which region of a plurality of regions set around the vehicle or in a vehicle interior the mobile terminal is positioned; and a selection unit selecting three distances from the distances acquired by the at least four communication devices depending on the region where the mobile terminal is positioned determined by the region determination unit, wherein the position determination unit determines a position of the mobile terminal from the three distances selected by the selection unit.

2. The position determination system according to claim 1, wherein the at least four communication devices include at least three first communication devices provided in the vehicle interior of the vehicle and acquiring respective distances to the mobile terminal, and a plurality of second communication devices provided outside the vehicle interior of the vehicle and acquiring respective distances to the mobile terminal.

3. The position determination system according to claim 2, wherein the at least three first communication devices are provided at positions different from positions of the plurality of second communication devices in a vehicle height direction, and the selection unit selects the three distances so as to include at least one distance of the distances acquired by the at least three first communication devices.

4. The position determination system according to claim 2, wherein the at least three first communication devices include three first communication devices disposed at positions different from one another when viewed along a vehicle height direction, at least two first communication devices of the three first communication devices are disposed at positions different from each other in a vehicle width direction, and at least two first communication devices of the three first communication devices are disposed at positions different from each other in a vehicle length direction.

5. The position determination system according to claim 4, wherein three straight lines connecting the three first communication devices form a triangle when viewed along a vehicle height direction.

6. The position determination system according to claim 2, wherein the at least three first communication devices are provided at positions higher than a lower end of a side window of the vehicle.

7. The position determination system according to claim 2, wherein two first communication devices of the at least three first communication devices are provided respectively in a pair of front pillars of the vehicle, and an other one first communication device of the at least three first communication devices is provided in a rear window or a peripheral member disposed around the rear window.

* * * * *